March 25, 1952

J. F. ATKINSON ET AL 2,590,083

ELECTRIC POWER DISTRIBUTION SYSTEM

Filed Sept. 14, 1949

INVENTORS
J. F. ATKINSON
J. M. McCUTCHEN
H. W. KELLEY

ATTORNEY

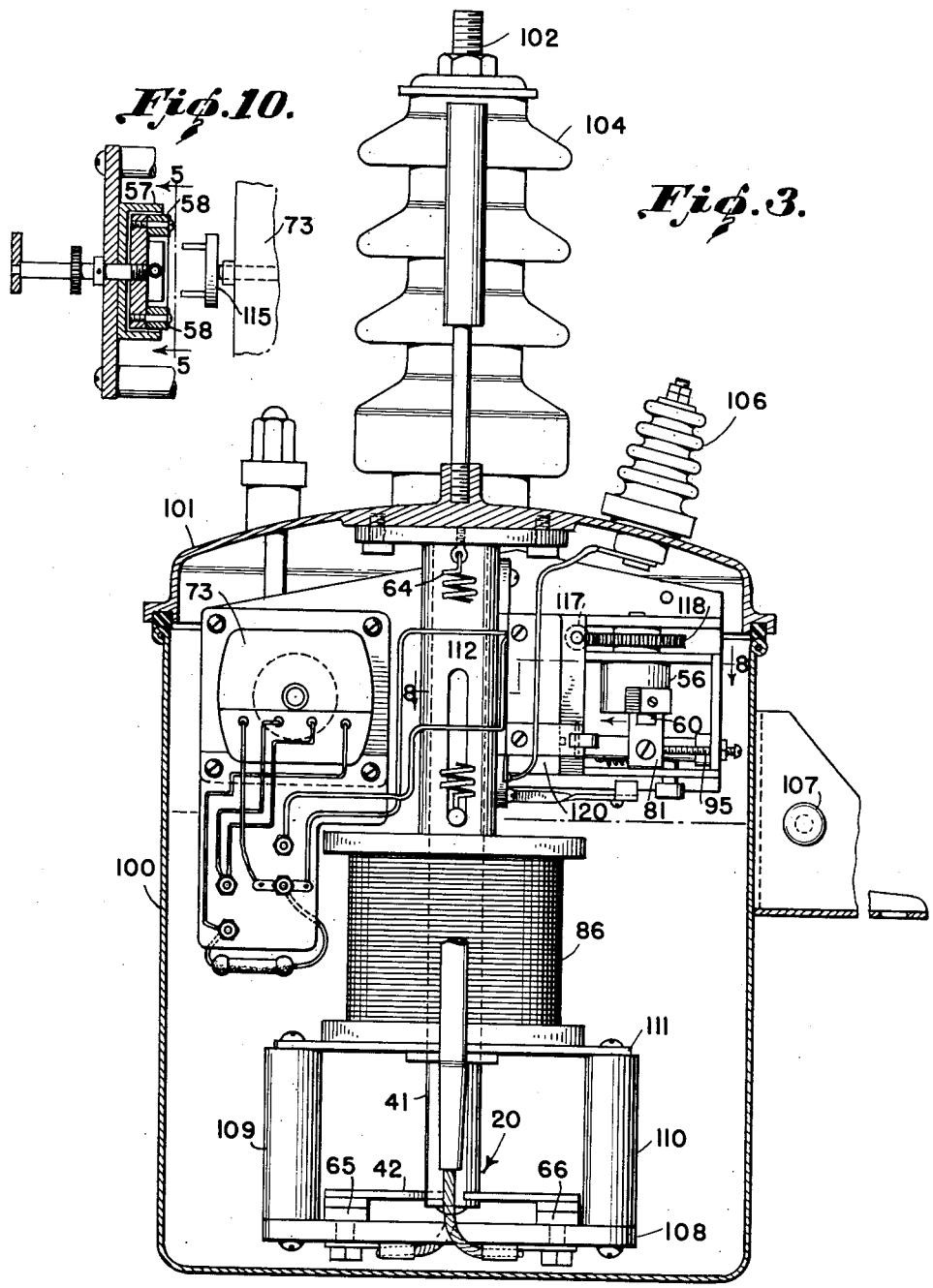

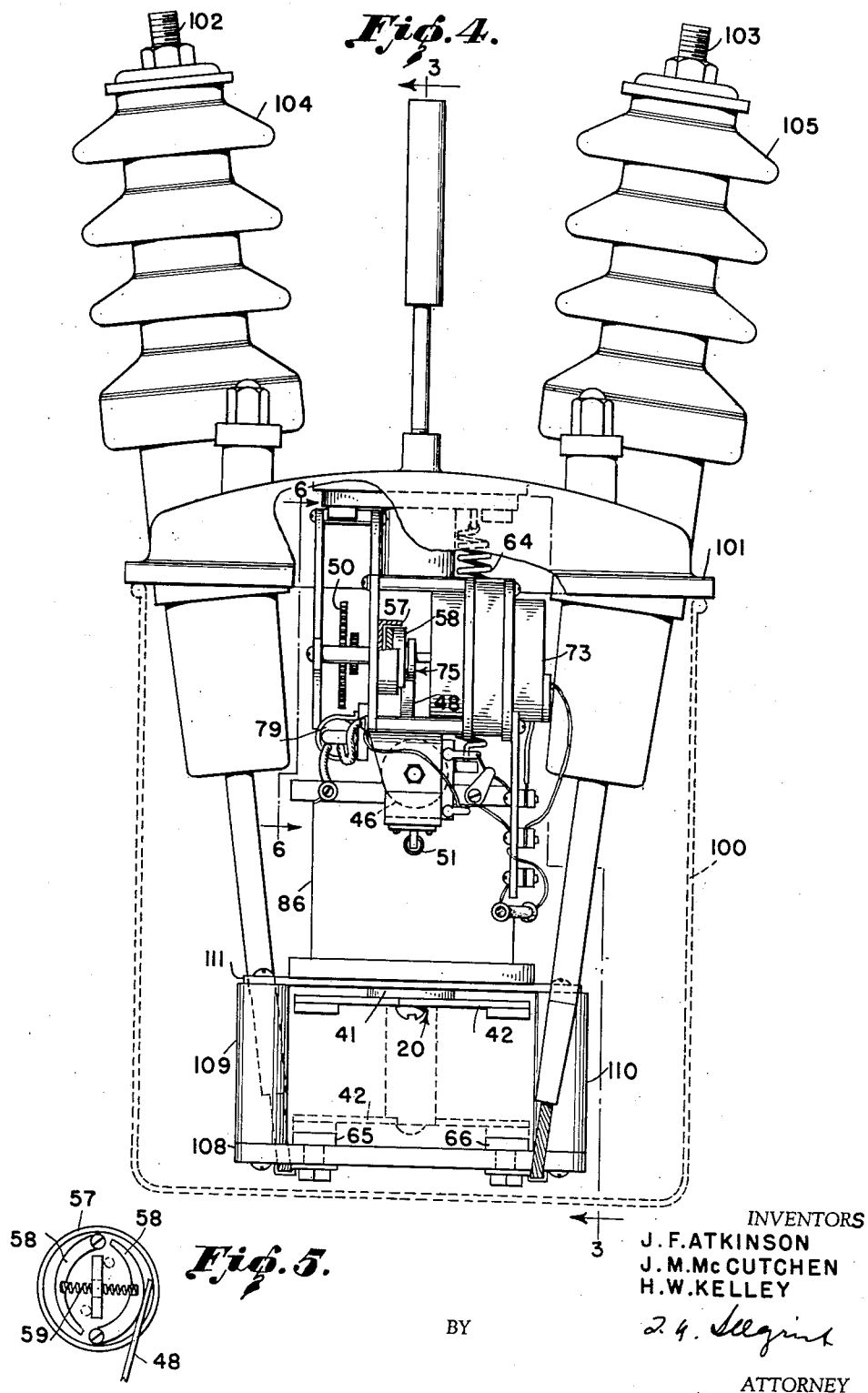

March 25, 1952 J. F. ATKINSON ET AL 2,590,083
ELECTRIC POWER DISTRIBUTION SYSTEM
Filed Sept. 14, 1949 4 Sheets-Sheet 4
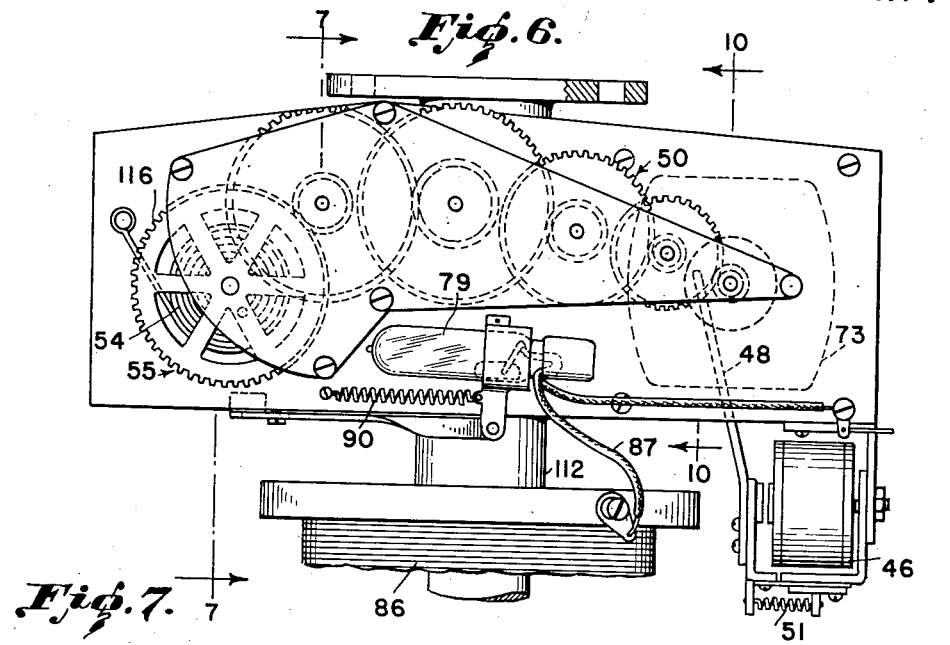
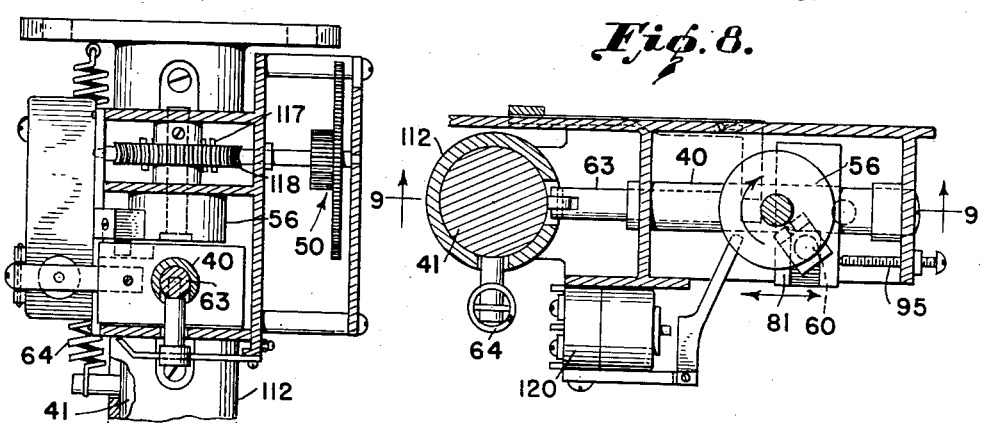
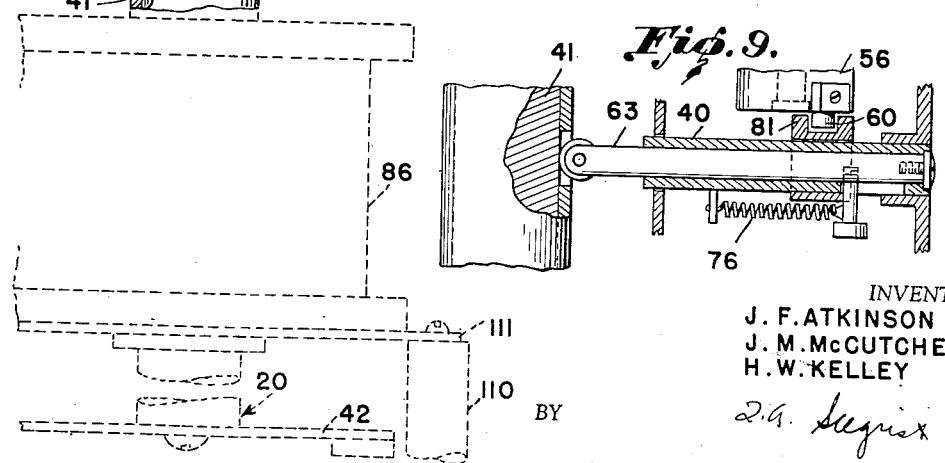
INVENTORS
J. F. ATKINSON
J. M. McCUTCHEN
H. W. KELLEY
BY
ATTORNEY Patented Mar. 25, 1952

2,590,083

UNITED STATES PATENT OFFICE 2,590,083

ELECTRIC POWER DISTRIBUTION SYSTEM

John F. Atkinson, Harold W. Kelley, and James M. McCutchen, Arlington, Va.

Application September 14, 1949, Serial No. 115,754

7 Claims. (Cl. 171—97)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to an electric power distribution system. Generally such a system has a power supply, such as a generating plant or substation, and has a circuit interrupter. Such circuit interrupter provides an interrupter switch in the hot side of the system, which usually is operated automatically due to overload, as occurs in case of a short circuit, to disconnect the portion of the circuit beyond the interrupter from the power supply.

After repair of the fault, the system is re-energized by closing the circuit interrupter switch. At times, if the system is heavily loaded, as for example in early evening and when it has been out an appreciable length of time to effect the repair, the actual starting load, due to turned-on lights, refrigerators, heaters, and so forth, is beyond the disconnect load of the circuit interrupter. In this circumstance, it is difficult or even impossible to close the interrupter switch and to maintain it closed without removal of part of the load from the system. This may require that linemen disconnect part or parts of the system and re-establish connections at intervals after closing of the interrupter switch thus to energize the system in successive portions. Such a practice is expensive and time consuming, especially in extensive systems such as occur in rural electrification, and is of considerable inconvenience to consumers because of the delays in re-establishing service.

In general, according to the present invention, at least two switches are connected in such a system in series with each other and with the power supply, power loads being connected to the portions of the system between the switches and beyond the switch which is the more remote from the power supply. One of these two switches may be the interrupter switch, and any number of additional switches may be used. Switch opening means, which operates automatically as a result of zero voltage in the system, as occurs for example upon opening of the interrupter switch, is provided to open the more remote switch. This sectionalizes the system. With one switch in addition to the interrupter switch as an example of a simple installation, the system is sectionalized into a portion between the interrupter switch and additional switch and a portion beyond the additional switch.

Preferably, the switch-opening means is so constructed as to open the switch it controls a selected interval of time after establishment of the zero voltage; that is, with a time lag, the zero voltage usually being established due to opening of the interrupter switch. This time lag prevents opening of the more remote switch due to momentary or zero voltages of short duration, that is, of a duration shorter than the selected interval required for opening the more remote switch. The interval selected will depend, of course, on conditions. If, for example, the system is operating normally under a light load, so that an outage of three minutes, say, will not result in a sufficient number of turn-ons of heaters, refrigerators, and so forth, to cause overload upon closing of the interrupter switch, the selected interval of time lag may be three minutes.

Switch-closing means, which operates automatically as a result of re-established voltage in that portion of the system between the switches due to closing of the switch less remote from the power supply, is also provided to close the more remote switch. It is essential that the switch closing means be so constructed as to operate a selected interval of time after closing of the less remote or interrupter switch so that the voltage will be re-established in the portion of the system beyond the more remote switch with a time lag corresponding to the selected interval after its re-establishment in the portion between the switches.

The interval selected for this purpose will also depend on conditions. If, for example, the various portions of the system are heavily loaded, a greater time lag will be required.

With the present system, it is possible easily to locate a system short circuit as being in any particular portion of the system. To explain this, assume a system provided with two switches in addition to the interrupter switch in series and a third additional switch in parallel with the second (i. e., controlling a branch). Assume the time lag for closing the three additional switches to be set at 1 minute, 2 minutes and 3 minutes, respectively. If now while the additional switches are all open, the interrupter switch is closed, it will be automatically thrown open at the time the particular additional switch closes, which controls the portion of the system having the short circuit. At 3 minutes, for example, the short circuit would be in the portion controlled by the switch set at 2 minutes. Thus, by setting the time intervals for closing the additional switches so that each portion of the system will be thrown in at a known interval after closing the interrupter switch, no two intervals being alike, to locate a short it is merely necessary to compare the time between closing of the interrupter switch and its automatic opening with the various known times required to throw in any portion of the system.

For a detail description of the invention, reference is made to the accompanying drawing, in which—

Figure 3 is a side elevation with the casing broken away of a unit comprising a suitable main switch and switch opening and closing means therefor.

Figure 4 is a similar side elevation of the same unit a quadrant displaced from the view of Figure 3;

Figure 5 is a section on line 5—5 of Figure 10;

Figure 6 is a detail view on line 6—6 of Figure 4;

Figure 7 is a section on line 7—7 of Figure 6;

Figure 8 is a section on line 8—8 of Figure 3;

Figure 9 is a section on line 9—9 of Figure 8; and

Figure 10 is a section on line 10—10 of Figure 6.

Figure 1:
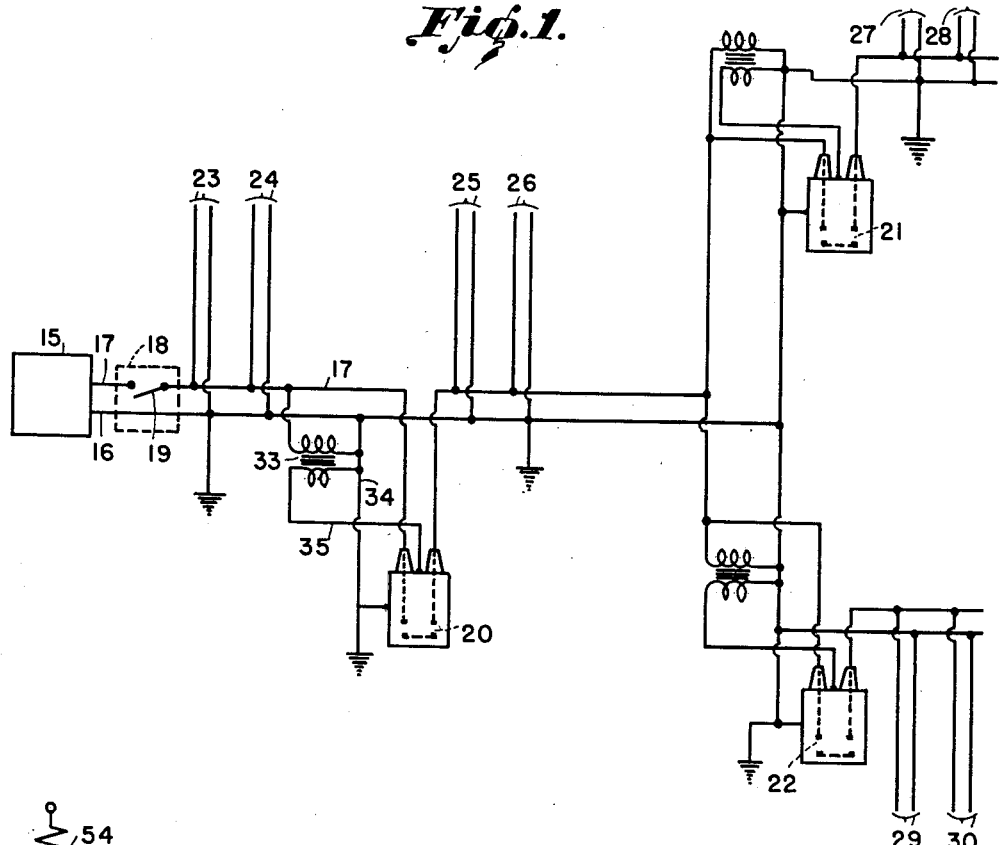
Figure 1 is a diagram of the power distribution system employing an interrupter switch and three additional switches.

Referring to Figure 1, 15 represents a substation supplying power through a neutral 16 and high voltage line 17. The representation is of a two-wire system, but the figure as well represents one circuit of a multiphase system. The circuit interrupter is represented at 18, interrupter switch 19 being shown in the hot or high voltage line 17 of the system.

Three similar additional switches are shown at 20, 21 and 22. Branch circuits or loads 23 and 24 are shown connected in the portion of the system between the switch 19 and the more remote switch 20, loads 25 and 26 in the portion between switch 20 and more remote switch 21 and which are controlled by switch 20, loads 27 and 28 in the portion beyond switch 21 and controlled thereby, and loads 29 and 30 in the portion beyond switch 22 and controlled thereby, the latter switch being in parallel with switch 21.

The opening and closing means for the various additional switches are designed in the particular installation represented, to operate on a 110 v. supply. Therefore, a transformer is illustrated at 33 for switch 20 to reduce the high voltage to the required 110 v. across the neutral 34 and line 35. A special transformer need not be provided for this purpose, since it is convenient to locate the switch near a point already having a 110 v. supply, as for example, on the same pole with a usual transformer for reducing the high voltage to consumer, or 110 v., and in this sense 33 may represent such a transformer.

Figure 2:
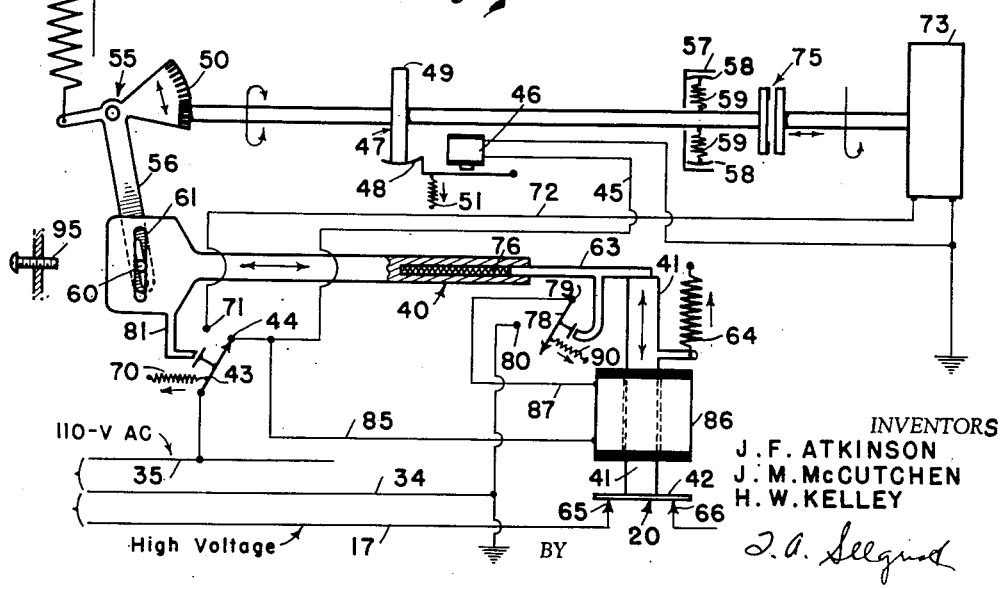
Figure 2 is a schematic showing of one of the additional switches and its switch opening and closing means.

Figure 2 is representative of switch 20 and its opening and closing means. Assume that the system is in operation. The setting will then be as illustrated. Switch 20 is normally held closed by latch 40 engaging over plunger 41 attached to resilient switch blade 42. Current from the 110 v. hot line 35 flows through switch blade 43, contact 44 and conductor 45 through solenoid 46 and to ground. This operates brake 47 to hold shoe 48 engaging brake drum 49 thus to prevent movement of gear train 50.

If interrupter switch 19 opens, thus to establish zero voltages in the system, the solenoid 46 is de-energized and spring 51 of brake 47 releases the brake. Spring 54 of spring motor 55, which is normally wound up and prevented from operating by brake 47, then runs down causing crank arm 56 to move to the left as viewed in Figure 2. A governor such as a fixed friction drum 57, shoes 58 thrown outwardly against the drum by centrifugal force and pulled inwardly by governor springs 59, controls the speed of the spring motor, the speed being determined by the tension of the governor springs and power of the motor. Movement of crank arm 56 moves the latch 40. The speed of movement of the latch depends on the speed of the spring motor and on the effective length of the crank arm. This effective length is made adjustable as by means of crank pin 60 operating in slot 61 and adjustable relative to the crank arm. Thus, the interval of time required to unlatch the latch may be selected by proper choice or adjustment of the controlling factors. As the latch moves to the left, spring-pressed detent 63 finally clears plunger 41. Spring 64 biased to open the switch thereupon raises switch blade 42 from contacts 65 and 66 thus to open the main switch 20.

The system is then out of operation and sectionalized. In this setting, spring 70 forces switch blade 43 onto contact 71. Assume now that voltage is re-established as by closing of interrupter switch 19. Current from re-energized line 35 will then flow through blade 43, contact 71 forming a motor switch, and conductor 72, operating constant speed electric motor 73, and to ground. The motor connects to the gear train 50 through clutch 75, which engages automatically when the motor starts, and operates to wind the spring motor and move latch 40 to the right as viewed in Figure 2. As the latch moves, detent 63 bears against plunger 41 and spring 76 is biased. Meanwhile, blade 78 of solenoid-disconnecting switch 79 is in contact with contact 80. When the latch has moved sufficiently far to the right to set it in operative position to latch the switch closed, lug 81 operates to move blade 43 off contact 71, thus to disconnect the motor, and onto contact 44, forming a solenoid-connecting switch. Current will then flow through conductor 85, solenoid 86, conductor 87, blade 78, contact 80 and to ground. This current is established by movement of blade 43 to contact 44, and the solenoid quickly forces the main switch blade 42 resiliently into contact with contacts 65 and 66. When this occurs, detent 63 slips over the end of the plunger 41. This allows blade 78 to open its solenoid-disconnecting switch due to action of spring 90, thus to disconnect the solenoid 86 from the circuit. Due to the fact that the solenoid disconnection is controlled by the movement of the detent 63, the solenoid does not disconnect until the detent has moved over the end of plunger 41, that is, after the latch is in position to hold the switch closed, thus to lock closed blade 42 of the main switch. Current now flows from conductor 35 only through solenoid 46 to hold brake shoe 48 in engagement with the drum 49, thus to prevent unwinding of the spring motor, and the setting is again that illustrated in Figure 2 with the system in operation.

In the particular unit herein illustrated, only two adjustments are used, motor 73 being of a fixed constant speed type and the tension of the governor springs 59 and related parts being constant. The time interval required to open the main switch is therefore determined by the speed of latch 40 with unwinding of the spring motor. Adjustment of the effective length of crank arm 56 by setting of crank pin 60 determines this interval within the range of adjustment. Overall variation can be obtained by resetting the governor or using a different speed spring motor.

An adjustable stop 95 provides the second adjustment. This adjusts the distance the latch 40 may be moved to the left (Figure 2) after opening of the main switch and consequently the distance the latch must be moved to the right by operation of the constant speed motor before the main switch automatically closes. The time interval required for total movement of the latch to the right is selected by proper setting of stop 95.

The unit including the main switch and its switch opening and closing means, structurally illustrated in Figures 4 through 10, has parts essentially corresponding to those described above relative to the diagrammatic showing, and these essential parts have been given the same characters throughout.

Referring now to the structural showing, the unit shown includes a housing 100, preferably oil filled, with a removable cover 101 on which the parts are mounted. The main switch terminals 102 and 103 are wired in through insulators 104 and 105 of conventional type.

The hot side of the 110 v. line for operating the switch opening and closing means is wired in through insulator 106, the ground side being connected directly to the casing which is in turn connected to the neutral of the line by means of lug 107.

The contacts 65 and 66 of the main switch are supported on an insulating strip 108 which is in turn supported by pillars 109 and 110 fixed to a cross piece 111 to which is attached an upright tube 112 bolted to the casing top as illustrated. Plunger 41 operates in tube 112 and solenoid 86 surrounds the tube.

The electric motor 73 is of conventional construction and is of the type which automatically throws clutch plate 115 into proper engagement when the motor is energized. The gear train 50 comprises a speed reduction system as best illustrated in Figure 6, one gear 116 being the spring motor gear and driving the screw 117 and worm gear 118, the latter being in effect the crank arm 56 previously mentioned.

Switch parts 43, 44, 70 and 71 previously described are structurally combined forming a conventional type snap action 2-way switch shown at 120 in Figure 8.

The solenoid disconnecting switch schematically illustrated at 79 is structurally illustrated in Figure 6 as a conventional mercury type tilt switch, tilted to open the switch when detent 63 is in position locking the main switch closed.

We claim:

1. In an electric power distribution system provided with a power supply, at least two switches connected in the system in series with each other and with the power supply, power loads connected to the portion of the system between the switches and beyond the switch more remote from the power supply, switch-opening means operating automatically as a result of zero voltage in the system to open the more remote switch, and switch-closing means operating automatically as a result of re-established voltage in that portion of the system between the switches due to closing of the switch less remote from the power supply to close the more remote switch, said switch-closing means being constructed to operate a selected interval of time after closing of the less remote switch, thus to re-establish the voltage in the system beyond the more remote switch a selected interval of time after its re-establishment in that portion between the switches.

2. The electric power distribution system as defined in claim 1, characterized in that the less remote switch is an interrupter switch which operates automatically due to overload to disconnect the portion of the system beyond it from the power supply.

3. The electric power distribution system as defined in claim 1, characterized in that the switch opening means is constructed to open the more remote switch a selected interval of time after establishment of the zero voltage thus to prevent opening of the more remote switch due to a zero voltage of a shorter duration than the selected interval required for opening the more remote switch.

4. The electric power distribution system as defined in claim 3, characterized in that the switch-opening means includes a spring biased to open the more remote switch, a latch which normally holds the more remote switch closed against the bias of the spring, a spring motor which runs down to unlatch the latch, and a brake for preventing operation of the spring motor, said brake being normally held applied as a result of voltage in the system and being released upon establishment of the zero voltage.

5. The electric power distribution system as defined in claim 4, characterized in that switch-closing means includes an electric motor energized by the re-established voltage to wind the spring motor and set the latch in operative position to latch the more remote switch closed, and a solenoid energized by the re-established voltage to close the more remote switch, said solenoid being connected into the re-established voltage by a solenoid-connecting switch operated by the motor a selected interval of time after the motor is energized and being disconnected from the re-established voltage by a solenoid-disconnecting switch operated by the latch to cause the disconnection after the latch is in position to hold the more remote switch closed.

6. In an electric power distribution system provided with a power supply, an interrupter switch connected in the system in series with the power supply, a plurality of additional switches connected in the system in series with each other and with the interrupter switch, and power loads connected to the portions of the system between the switches, each additional switch having switch-opening means operated automatically as a result of zero voltage in the system due to opening of the interrupter switch to open its switch and having switch-closing means operated automatically as a result of re-established voltage in the portion of the system between it and the next switch less remote from the power supply to close its switch, said switch-closing means being constructed to operate a selected interval of time after re-establishment of the voltage, whereby upon re-establishment of the voltage due to closing the interrupter switch the switch-closing means operate to close the additional switches in succession thus to re-establish the voltage successively in the portions of the system between the switches with time-interval lags between reestablishments corresponding to the selected intervals of time of the switch-closing means.

7. The electric power distribution system as defined in claim 6, characterized in that each switch-opening means is constructed to open its switch a selected interval of time after establishment of the zero voltage thus to prevent opening of the additional switches due to a zero voltage of shorter duration than the selected interval required for opening the additional switches.

JOHN F. ATKINSON.
HAROLD W. KELLEY.
JAMES M. McCUTCHEN.

REFERENCES CITED

The following references are of record in the file of this patent:

UNITED STATES PATENTS

| Number | Name | Date |
|---|---|---|
| 2,231,052 | Bryson | Feb. 11, 1941 |
| 2,240,656 | Lindstrom | May 6, 1941 |
| 2,333,459 | Atwood | Nov. 2, 1943 |
| 2,445,836 | McCrosky | July 27, 1948 |